(12) United States Patent
Backus et al.

(10) Patent No.: US 12,505,475 B2
(45) Date of Patent: Dec. 23, 2025

(54) REPEATING VERIFICATION OF A USER

(71) Applicant: Plaid Inc., San Francisco, CA (US)

(72) Inventors: John Backus, Miami, FL (US); Faris Toqan, Chicago, IL (US)

(73) Assignee: Plaid Inc., San Francisco, CA (US)

( * ) Notice: Subject to any disclaimer, the term of this patent is extended or adjusted under 35 U.S.C. 154(b) by 319 days.

(21) Appl. No.: 18/194,476

(22) Filed: Mar. 31, 2023

(65) Prior Publication Data

US 2023/0319040 A1 Oct. 5, 2023

Related U.S. Application Data

(60) Provisional application No. 63/362,280, filed on Mar. 31, 2022.

(51) Int. Cl.

| | |
|---|---|
| *G06Q 30/0601* | (2023.01) |
| *G06F 3/0481* | (2022.01) |
| *G06F 3/0482* | (2013.01) |
| *G06F 8/38* | (2018.01) |
| *G06F 9/448* | (2018.01) |
| *G06F 9/451* | (2018.01) |
| *G06F 21/32* | (2013.01) |
| *G06F 21/36* | (2013.01) |
| *H04L 9/40* | (2022.01) |

(52) U.S. Cl.
CPC ....... *G06Q 30/0609* (2013.01); *G06F 3/0481* (2013.01); *G06F 3/0482* (2013.01); *G06F 8/38* (2013.01); *G06F 9/4498* (2018.02); *G06F 9/451* (2018.02); *G06F 21/32* (2013.01); *G06F 21/36* (2013.01); *H04L 63/0876* (2013.01); *H04L 63/0884* (2013.01)

(58) Field of Classification Search
CPC ... G06Q 30/0609; G06F 9/451; G06F 3/0481; G06F 3/0482; H04L 63/0876; H04L 63/0884
USPC .............................................. 726/6
See application file for complete search history.

(56) References Cited

U.S. PATENT DOCUMENTS

| | | | |
|---|---|---|---|
| 2002/0133721 A1* | 9/2002 | Adjaoute | G06Q 20/40 726/23 |
| 2003/0105862 A1* | 6/2003 | Villavicencio | H04L 67/306 709/225 |
| 2004/0243477 A1 | 12/2004 | Mathai et al. | |
| 2007/0174260 A1* | 7/2007 | Bachman | G06F 16/9532 |
| 2007/0178883 A1* | 8/2007 | Nandagopal | G06Q 20/385 455/411 |
| 2011/0047014 A1 | 2/2011 | De | |
| 2013/0159188 A1 | 6/2013 | Andon | |

(Continued)

FOREIGN PATENT DOCUMENTS

CN 113468514 A * 10/2021 ............. G06F 21/32

*Primary Examiner* — Zi Ye
(74) *Attorney, Agent, or Firm* — Harrity & Harrity, LLP

(57) ABSTRACT

In some implementations, a verification system may receive input from a user associated with an account that already underwent a verification procedure. Accordingly, the verification system may generate at least one graphical user interface associated with a first verification operation, within the verification procedure, that is associated with a failed outcome. The verification system may perform verification of the user based on new input for the first verification operation and old input for one or more additional verification operations within the verification procedure.

20 Claims, 14 Drawing Sheets

(56) References Cited

U.S. PATENT DOCUMENTS

| | | | |
|---|---|---|---|
| 2014/0282978 A1* | 9/2014 | Lerner | H04L 63/083 |
| | | | 726/7 |
| 2019/0213608 A1 | 7/2019 | Ouyang et al. | |
| 2019/0364034 A1* | 11/2019 | Alexander | H04L 63/12 |
| 2021/0209606 A1 | 7/2021 | Herlands | |
| 2022/0254045 A1 | 8/2022 | Boardman et al. | |

* cited by examiner

| Name | Verified by |
|---|---|
| > User 1 | Commercial, Consumer, Credit, Gov... |
| First Name | 221a—⊙ Credit  ⊙ Commercial—221c  Match |
| | 221b—⊙ Government  ⊙ Consumer—221d  Match |
| Last Name | ⊙ Credit  ⊙ Commercial  Match |
| | ⊙ Government  ⊙ Consumer |

Related Customer

Multiple accounts have been opened from the same device as the session you're currently viewing. This is often a sign of fraud

| Flow session ID | Customer Reference | Created At | Status |
|---|---|---|---|
| flwses_6idkFwsEtRmCix | hosted/a6910aa5-53bf | 12/30/21, 1:29 | Passed |
| flwses_5WroDYGMAJc | hosted/1f90b606-fa72 | 12/30/21, 1:18 | Failed |
| flwses_9HUkau7TWU | hosted/e5b7a4f3-88a | 12/17/21, 6:45 | In Progress |

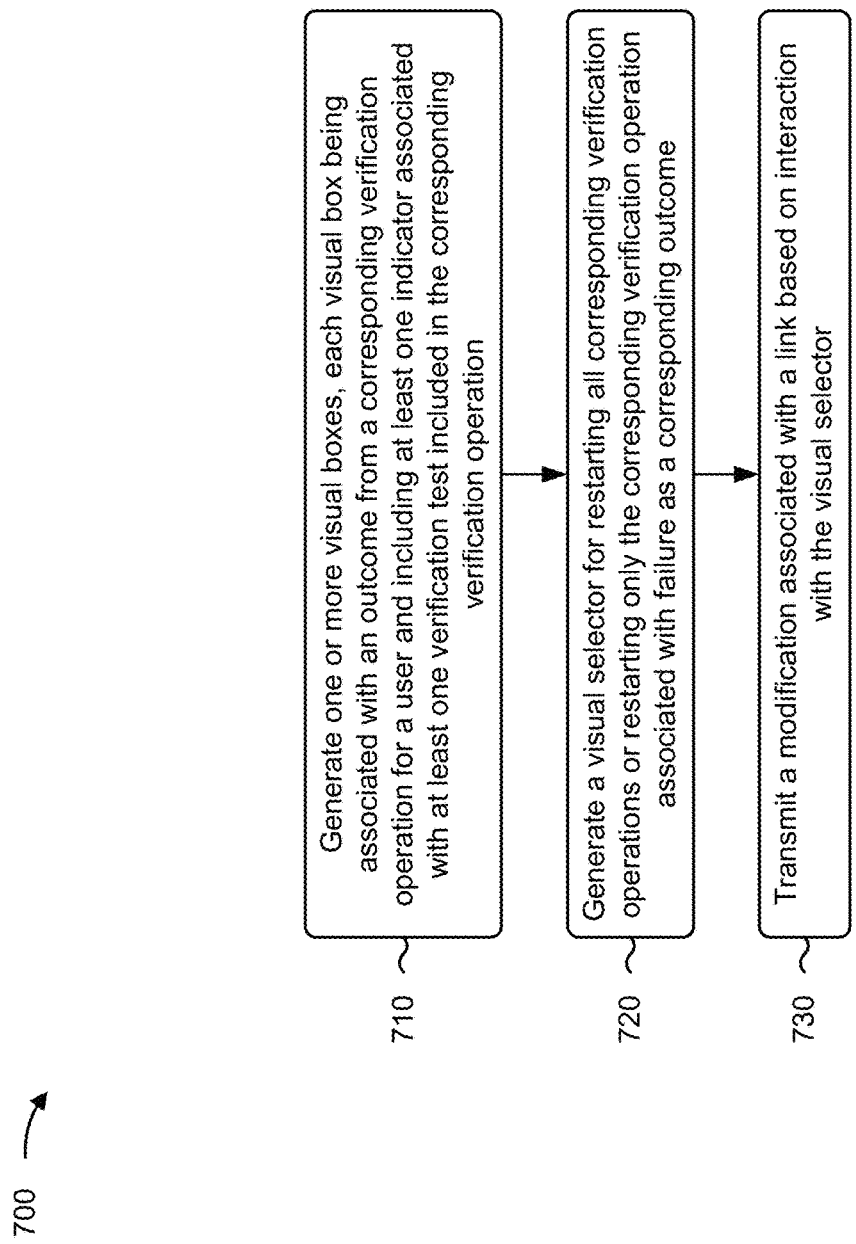

REPEATING VERIFICATION OF A USER

CROSS-REFERENCE TO RELATED APPLICATION

This Patent Application claims priority to U.S. Provisional Patent Application No. 63/362,280, filed on Mar. 31, 2022, and entitled "USER VERIFICATION PROCEDURES AND INTERFACES." The disclosure of the prior Application is considered part of and is incorporated by reference into this Patent Application.

BACKGROUND

Often, user verification is required (e.g., by law and/or regulation) or at least useful (e.g., to prevent spam, fraud, and other resource-draining activities for a computing service). User verification may involve matching (or fuzzy matching) information associated with the user and/or processing media (such as videos or images) associated with the user.

SUMMARY

Some implementations described herein relate to a system for repeating verification of a user. The system may include one or more memories and one or more processors communicatively coupled to the one or more memories. The one or more processors may be configured to receive a request to verify a user. The one or more processors may be configured to generate instructions for a plurality of first user interfaces (UIs) associated with a verification procedure for the user that includes a plurality of verification operations. The one or more processors may be configured to receive first input associated with the user. The one or more processors may be configured to determine that the verification procedure is associated with a failed outcome. The one or more processors may be configured to receive a request to reattempt verification of the user. The one or more processors may be configured to generate instructions for at least one second UI associated with at least one verification operation of the plurality of verification operations included within the verification procedure. The one or more processors may be configured to receive second input associated with the user. The one or more processors may be configured to verify the user based on the second input for the at least one verification operation and the first input for one or more remaining verification operations included within the verification procedure.

Some implementations described herein relate to a method of providing visual interfaces for verification outcomes. The method may include generating one or more visual boxes, wherein each visual box is associated with an outcome from a corresponding verification operation for a user and includes at least one indicator associated with at least one verification test included in the corresponding verification operation. The method may include generating a visual selector for restarting all corresponding verification operations or restarting only the corresponding verification operation associated with failure as a corresponding outcome. The method may include transmitting a modification associated with a link based on interaction with the visual selector.

Some implementations described herein relate to a non-transitory computer-readable medium that stores a set of instructions for repeating verification of a user for a device. The set of instructions, when executed by one or more processors of the device, may cause the device to receive input from the user associated with an account that already underwent a verification procedure. The set of instructions, when executed by one or more processors of the device, may cause the device to generate instructions for at least one UI associated with a first verification operation, within the verification procedure, that is associated with a failed outcome. The set of instructions, when executed by one or more processors of the device, may cause the device to perform verification of the user based on new input for the first verification operation and old input for one or more additional verification operations within the verification procedure.

BRIEF DESCRIPTION OF THE DRAWINGS

FIGS. 2A-2D are diagrams of example user interfaces (UIs) associated with verification outcomes for a user.

FIGS. 6-7 are flowcharts of example processes relating to repeating verification of a user.

DETAILED DESCRIPTION

The following detailed description of example implementations refers to the accompanying drawings. The same reference numbers in different drawings may identify the same or similar elements.

Verifying a user may involve multiple verification operations. For example, some verification operations may be text-based (e.g., verifying an address against public records, verifying a national identity number against public records, or verifying a telephone number or another type of two-factor authorization contact, among other examples), while some verification operations may be biometric (e.g., verifying a selfie of the user against an identification document or verifying a fingerprint of the user against public records, among other examples).

Verification operations may fail for many reasons. For example, the user may enter a typo in a response that causes a failure when the response is verified against a public record. In another example, the user may submit a poorly focused selfie such that a machine learning algorithm is unable to verify the selfie against a document submitted by the user. Generally, the user may undergo a new round of verification to try and overcome failure. However, re-performing user verification from scratch is computationally costly. For example, a user device consumes additional power, processing resources, memory overhead, and network overhead in transmitting information, some of which will be duplicated from a previous verification attempt. Additionally, a system performing the user verification consumes additional power, processing resources, and memory overhead in reprocessing the information from the user device, including the duplicated information.

Some implementations described herein provide for verifying a user with a combination of new input for some verification operations and old input for additional verification operations. As a result, a user device conserves power, processing resources, memory overhead, and network overhead as compared with beginning verification from scratch. Additionally, a verification system conserves power, processing resources, and memory overhead as compared with beginning verification from scratch.

FIGS. 1A-1D are diagrams of an example 100 associated with repeating verification of a user. As shown in FIGS. 1A-1D, example 100 includes a verification system, a client device, and a user device. These devices are described in more detail in connection with FIGS. 4 and 5.

Figure 1A:
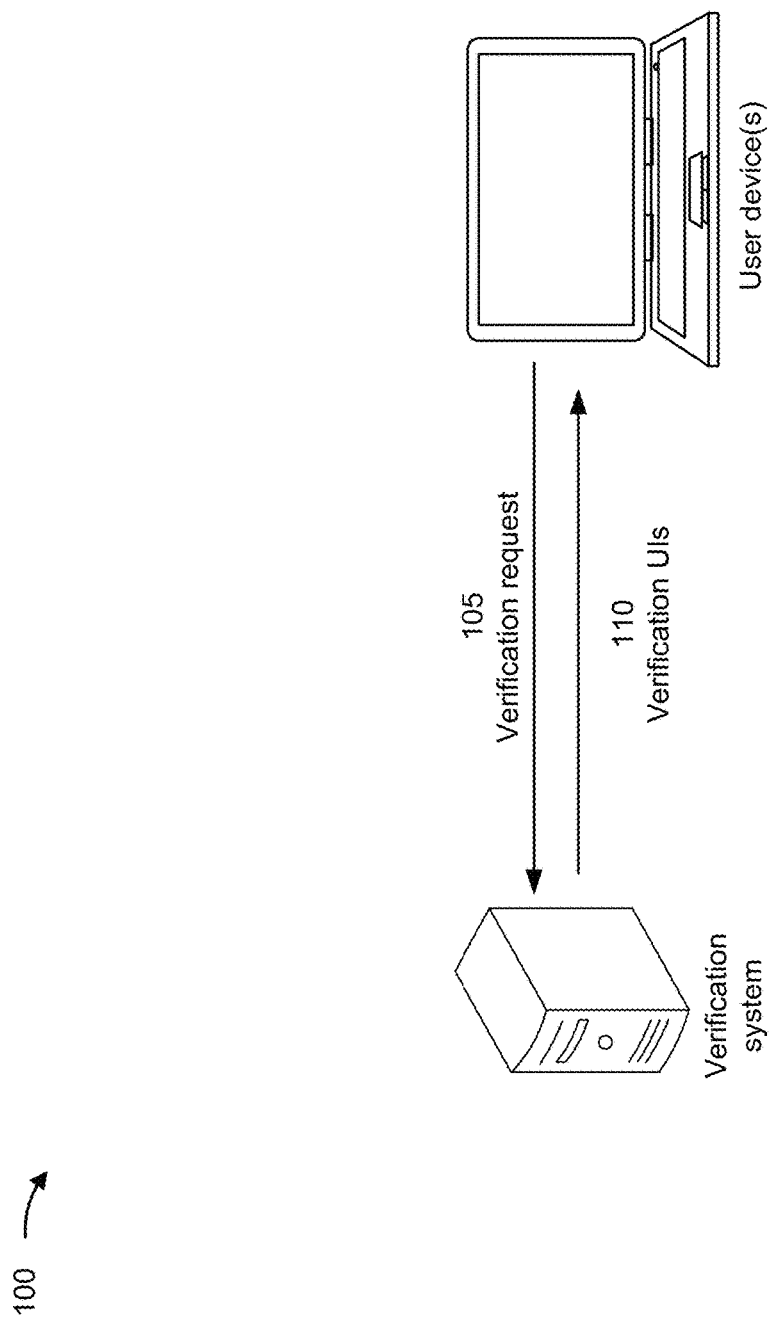
FIGS. 1A-1D are diagrams of an example implementation relating to repeating verification of a user.

As shown in FIG. 1A and by reference number 105, the user device may transmit, and the verification system may receive, a request to initiate verification. In some implementations, a user may input a command to the user device that triggers transmission of the request. For example, the user, via the user device, may access a website (e.g., via a uniform resource locator (URL)) hosted by, or otherwise associated with, the verification system. The user may therefore input the command by interacting with the website. For example, the user may request creation of an account, associated with the user, on the website, which triggers the request to initiate verification. In some implementations, the user, via the user device, may access a website hosted by, or at least associated with, a third party that subscribes to a verification service provided by the verification system. For example, the user may request creation of an account, associated with the user, on the third party's website, which triggers the request to initiate verification (e.g., via a redirect to the verification system from the third party's website).

As shown by reference number 110, the verification system may transmit, and the user device may receive, instructions for generating a plurality of first user interfaces (UIs). For example, the verification system may transmit the instructions for generating the plurality of first UIs in response to the request to initiate verification. The verification system may thus provide, and the user device may show, the plurality of first UIs (e.g., simultaneously or in sequence).

Figure 1B:
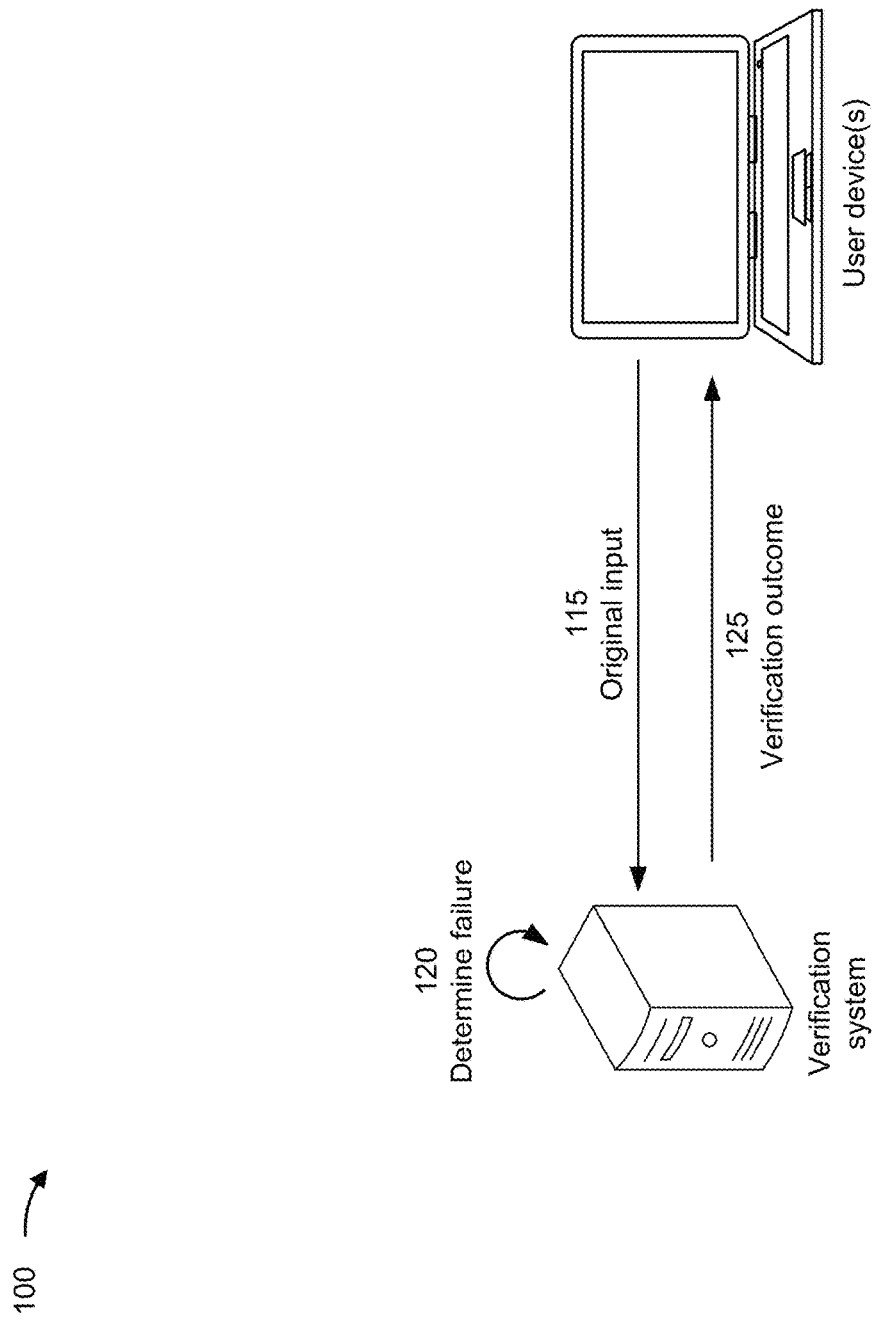

As shown in FIG. 1B and by reference number 115, the user device may transmit, and the verification system may receive, input associated with the user for verification. For example, the user may interact with the plurality of first UIs (e.g., using a mouse, a touchscreen, a keyboard, and/or another type of input component) such that the input is based on the interaction. In some implementations, the input may include information associated with and entered by the user (e.g., into input elements of the plurality of first UIs) for text-based verification operations (e.g., one or more text-based verification operations). The text-based verification operations may be associated with verification of a location of residence (e.g., against a whitelist and/or a blacklist of locations), a name (e.g., against a ban list, such as a sanction list), or a telephone number (e.g., using a two-factor procedure), among other examples. Additionally, or alternatively, the input may include a captured image (and/or a captured video) uploaded by the user to the verification system for image-based verification operations (e.g., one or more image-based verification operations). The image-based verification operations may be associated with verification of a selfie of the user (e.g., using a plurality of facial features extracted using a neural network or another type of machine learning model) and/or a video of the user (e.g., using a plurality of features, extracted using a neural network or another type of machine learning model, that indicate a heartbeat and/or another indicium of liveness), an image of the document (e.g., using a plurality of features extracted using a neural network or another type of machine learning model) and/or a video of the document (e.g., using a plurality of features, extracted using a neural network or another type of machine learning model, that indicate a paper sheen and/or another indicium of liveness), among other examples. Additionally, or alternatively, the input may include a fingerprint scan, a retina scan, and/or another type of biometric information.

In some implementations, the verification system may receive the input from a plurality of user devices. Accordingly, the verification system may transmit, and the user device may receive, instructions for generating a first portion of the plurality of first UIs. Thus, the verification system may receive a first portion of the input based on interaction with the first portion of the plurality of first UIs. Additionally, the verification system may transmit, and an additional user device may receive, instructions for generating a second portion of the plurality of first UIs (e.g., a remaining portion of the plurality of first UIs). Thus, the verification system may receive a second portion of the input based on interaction with the second portion of the plurality of first UIs.

As shown by reference number 120, the verification system may determine that the verification procedure is associated with a failed outcome. For example, the verification system may apply the input to stored verification rules (e.g., one or more stored verification rules). The stored verification rules may be associated with text-based verification operations and/or image-based verification operations, as described above.

As shown by reference number 125, the verification system may transmit, and the user device may receive, an indication of a verification outcome. For example, the verification outcome may be a Boolean (e.g., a fail indication). The indication may be an overall indication of all verification operations (e.g., strung together using AND operations). Additionally, or alternatively, the indication may include indications corresponding to each of the verification operations (e.g., indicating separate outcomes from separate verification operations).

Figure 1C:
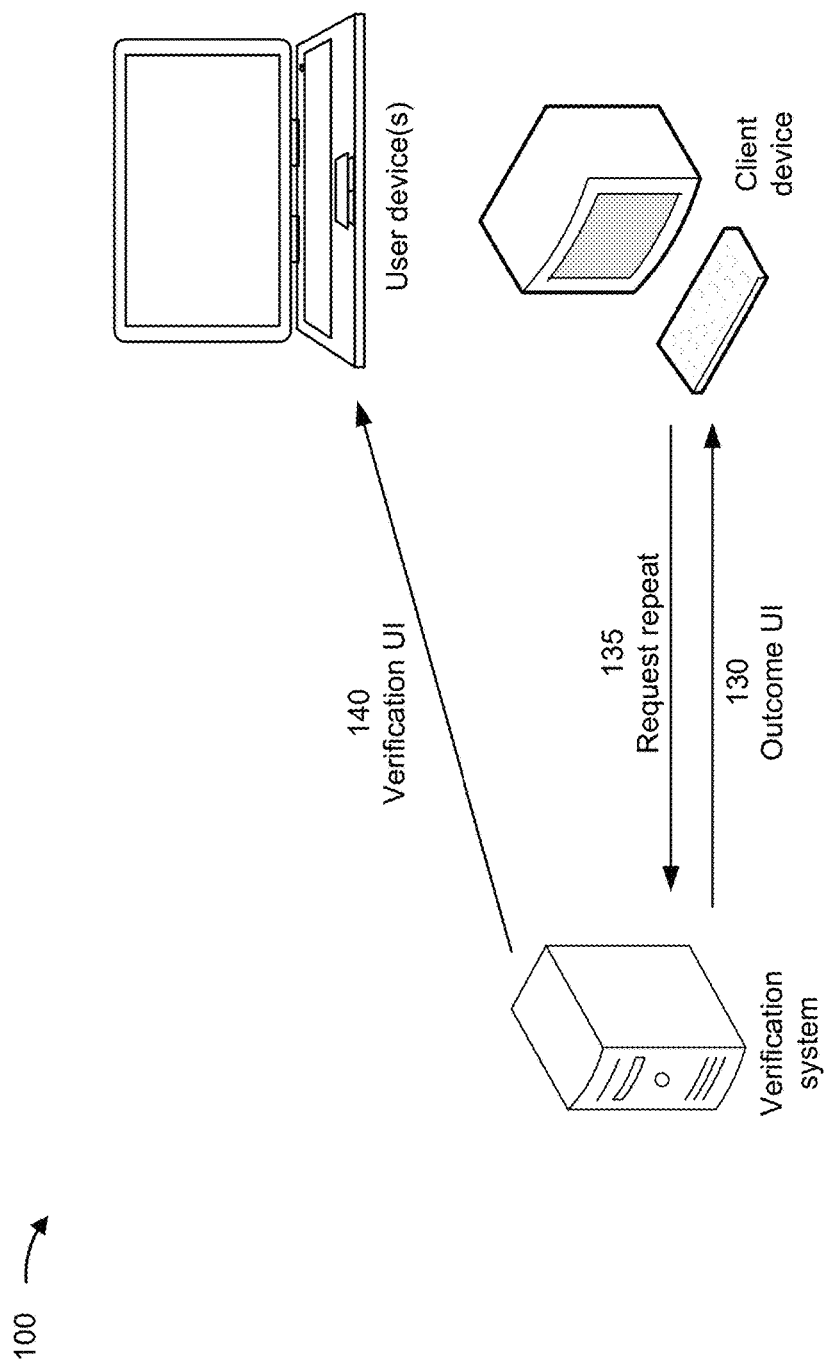

As shown in FIG. 1C and by reference number 130, the verification system may transmit, and the client device may receive, instructions for generating a UI associated with results of verifying the user. The UI may include elements as described in connection with FIGS. 2A-2B. For example, the client device may generate visual boxes (e.g., one or more visual boxes), where each visual box is associated with an outcome from a corresponding verification operation for the user. Additionally, each visual box may include an indicator (e.g., at least one indicator) associated with a verification test (e.g., at least one verification test) included in the corresponding verification operation. Accordingly, the verification system may provide, and the client device may show, the visual boxes.

In some implementations, the verification system may determine that the user is associated with accounts (e.g., one or more accounts) with external service providers (e.g., one or more external service providers). For example, the verification system may transmit requests (e.g., one or more requests), such as hypertext transfer protocol (HTTP) requests and/or application programming interface (API) calls, to data aggregators (e.g., one or more data aggregators) that include identifiers (e.g., one or more identifiers) associated with the user. The identifiers may include a name (and/or possible variants) associated with the user, an email address associated with the user, and/or a telephone number associated with the user, among other examples. The data aggregators may transmit, and the verification system may receive, indications (e.g., one or more indications) of the accounts with the external service providers. Accordingly, the verification system may transmit, and the client device may receive, instructions for generating visual indicators (e.g., one or more visual indicators) of the accounts. The visual indicators may be as described in connection with FIG. 2A. Accordingly, the verification system may provide, and the client device may show, the visual indicators adjacent to the visual boxes.

In some implementations, the verification system may transmit the instructions for the UI associated with the results automatically in response to determining failure, as described above. Alternatively, the verification system may transmit the instructions for the UI associated with the results in response to a request from the client device. For example, an administrator of the client device may input a command to the client device that causes the client device to transmit the request to the verification system; accordingly, the request may trigger the verification system to transmit the instructions for the UI associated with the results. The administrator may interact with a UI such that the command is based on the interaction. In some implementations, the administrator may provide credentials (e.g., one or more credentials) to the client device such that the client device transmits the credentials before, or included with, the request.

In some implementations, the UI associated with the results may be interactive. For example, the client device may transmit, and the verification system may receive, an indication of an interaction with the indicator included in one of the visual boxes. The administrator may interact with the indicator using a mouse, a touchscreen, a keyboard, and/or another type of input component. Accordingly, the verification system may transmit, and the client device may receive, instructions for generating a plurality of additional indicators associated with the verification test included in the corresponding verification procedure and associated with outcomes of the verification test from a plurality of data sources. The additional indicators may be as described in connection with FIG. 2C. Accordingly, the verification system may provide, and the client device may show, the additional indicators below the indicator that was interacted with and included in the same visual box.

Additionally, or alternatively, the verification system may determine that a device identifier or an Internet protocol (IP) address, associated with the user, is associated with additional verification attempts (e.g., one or more additional verification attempts). For example, the verification system may query a cache or another type of storage local to the verification system that stores a data structure linking device identifiers and/or IP addresses to representations of verification attempts. Additionally, or alternatively, the verification system may query a storage at least partially separate from the verification system (e.g., physically, logically, and/or virtually) that stores a data structure linking device identifiers and/or IP addresses to representations of verification attempts. Accordingly, the verification system may determine the additional verification attempts based on a response to the query. The additional verification attempts may be associated with a same client of the verification system (e.g., in order to protect security and privacy between clients). Alternatively, the additional verification attempts may be associated with a plurality of clients of the verification system (e.g., based on an information sharing agreement between the plurality of clients). Accordingly, the verification system may transmit, and the client device may receive, instructions for generating an indication of the additional verification attempts. The indication may include a numerical value. The verification system may provide, and the client device may show, the indication adjacent to the visual boxes. Additionally, the client device may transmit, and the verification system may receive, an indication of an interaction with the indication of the additional verification attempt. The administrator may interact with the indication using a mouse, a touchscreen, a keyboard, and/or another type of input component. Accordingly, the verification system may transmit, and the client device may receive, instructions for generating an overlay window including details associated with the additional verification attempts. The overlay window may be as described in connection with FIG. 2D. Accordingly, the verification system may provide, and the client device may show, the overlay window in front of the visual boxes.

As shown by reference number 135, the client device may transmit, and the verification system may receive, a request to repeat a verification associated with the user. For example, the administrator of the client device may input a command to the client device that causes the client device to transmit the request to the verification system. The administrator may interact with the UI (e.g., using a mouse, a touchscreen, a keyboard, and/or another type of input component) associated with the results such that the command is based on the interaction.

In some implementations, the verification system may transmit, and the client device may receive, instructions for generating a visual selector for restarting all corresponding verification procedures or restarting only the corresponding verification procedure associated with failure as a corresponding outcome. The visual selector may be as described in connection with FIG. 3A. Accordingly, the verification system may provide, and the client device may show, the visual selector in front of (or adjacent to) the visual boxes. Therefore, the verification system may receive the request using a UI as described in connection with FIG. 3A.

Figure 3A:
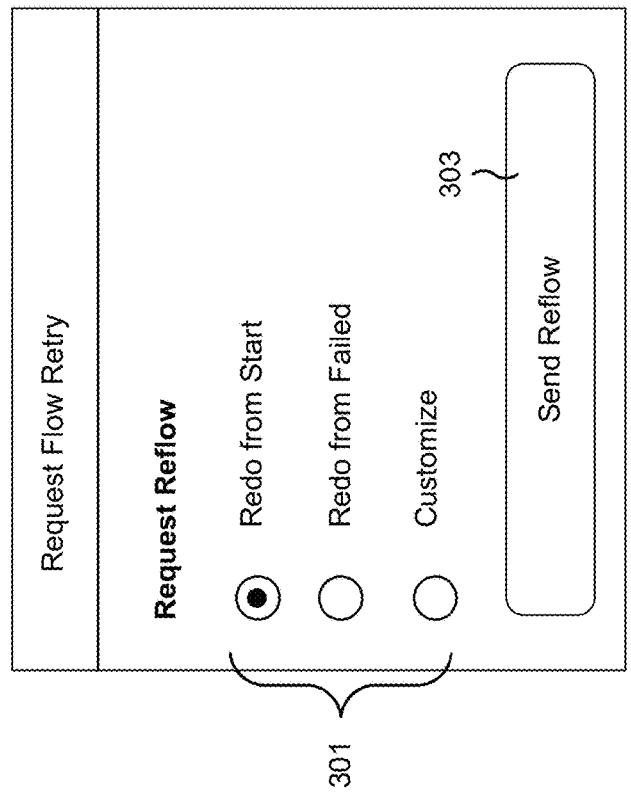
FIGS. 3A-3B are diagrams of example UIs associated with repeating verification procedures for a user.

Accordingly, the verification system may transmit a modification associated with a link based on interaction with the visual selector. For example, the administrator of the client device may interact with a set of radio buttons (e.g., as shown in FIG. 3A) and a button (e.g., as further shown in FIG. 3A) in order to trigger transmission of the request to the verification system. The verification system may transmit the modification in response to the request from the client device.

In some implementations, the verification system may provide a new URL (e.g., as described in connection with FIG. 3B), where the new URL triggers repeat verification for the user. The verification system may transmit the new URL directly to the user device. Alternatively, the verification system may transmit the new URL to the client device, such that the administrator of the client device may instruct the client device to transmit the new URL to the user device. Alternatively, the verification system may transmit a command to modify an HTTP response (e.g., associated with an existing URL pointing toward, for example, a login webpage). Accordingly, the existing URL may trigger repeat verification for the user (e.g., when the user returns to the login webpage via the existing URL).

The user device may transmit, and the verification system may receive, input associated with the account of the user that already underwent a verification procedure (e.g., as described in connection with FIGS. 1A-1B). For example, the input may include a request to reattempt verification of the user. In some implementations, the user may input a command to the user device that triggers transmission of the request. For example, the user, via the user device, may access a website (e.g., via the new URL and/or the existing URL, as described above). The user may therefore input the command by interacting with the website. For example, the user may log into the account, associated with the user, on the website, which triggers the request to repeat verification. In some implementations, as described above, the website may be hosted by, or at least associated with, a third party that subscribes to a verification service provided by the verification system. For example, the user may log into the account, associated with the user, on the third party's website, which triggers the request to repeat verification (e.g., via a redirect to the verification system from the third party's website).

As shown by reference number 140, the verification system may transmit, and the user device may receive, instructions for generating a second UI (e.g., at least one second UI). For example, the verification system may transmit the instructions for generating the second UI in response to the request to repeat verification. The verification system may thus provide, and the user device may show, the second UI. The second UI may be associated with a first verification operation (e.g., one or more first verification operations), within the verification procedure, that are associated with the failed outcome.

Figure 1D:
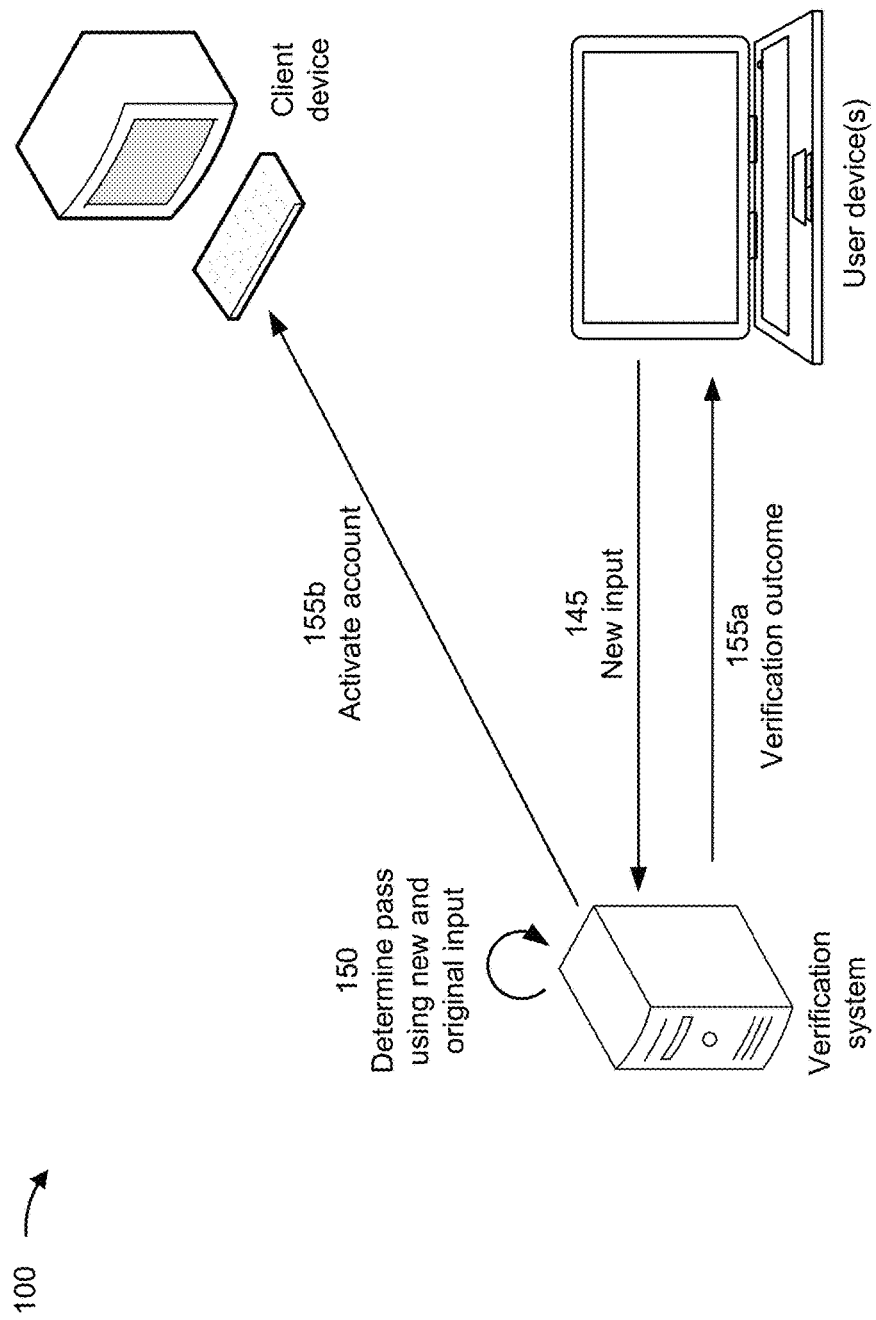

As shown in FIG. 1D and by reference number 145, the user device may transmit, and the verification system may receive, new input associated with the user for verification. For example, the user may interact with the second UI (e.g., using a mouse, a touchscreen, a keyboard, and/or another type of input component) such that the new input is based on the interaction. In some implementations, the new input may include information associated with and entered by the user (e.g., into input elements of the second UI) for text-based verification operations (e.g., one or more text-based verification operations, as described above). Additionally, or alternatively, the new input may include a captured image (and/or a captured video) uploaded by the user to the verification system for image-based verification operations (e.g., one or more image-based verification operations, as described above). Additionally, or alternatively, the new input may include a fingerprint scan, a retina scan, and/or another type of biometric information. In some implementations, the verification system may receive the new input from a plurality of user devices (e.g., similarly as described above).

The verification system may refrain from generating instructions for additional UIs (e.g., one or more additional UIs) associated with remaining verification operations (e.g., one or more remaining verification operations) included within the verification procedure. For example, the remaining verification operations may be associated with a successful outcome. As a result, the verification system (and the user device) conserve power and processing resources by refraining from re-exchanging information that was previously verified. Alternatively, the administrator may instruct the verification system (e.g., via the client device) to repeat all verification operations (e.g., as described in connection with FIG. 3B).

As shown by reference number 150, the verification system may verify the user (in other words, determine a pass of the verification procedure) based on the new input for the first verification operation included within the verification procedure and original input for the remaining verification operations included within the verification procedure. For example, the verification system may apply the new input to stored verification rules (e.g., one or more stored verification rules) associated with the first verification operation. The stored verification rules may be associated with text-based verification operations and/or image-based verification operations, as described above. In some implementations, the verification system may further apply the old input to stored verification rules (e.g., one or more stored verification rules) associated with the remaining verification operations. Alternatively, the verification system may refrain from repeating the remaining verification operations (e.g., refrain from applying the stored verification rules, associated with the remaining verification operations, to the original input). As a result, the verification system may further conserve power and processing resources.

As shown by reference number 155a, the verification system may transmit, and the user device may receive, an indication of a verification outcome. For example, the verification outcome may be a Boolean (e.g., a pass indication). The indication may be an overall indication of all verification operations (e.g., strung together using AND operations). Additionally, or alternatively, the indication may include indications corresponding to each verification operation (e.g., indicating separate outcomes from separate verification operations).

Additionally, or alternatively, in some implementations, as shown by reference number 155b, the verification system may activate the account associated with the user based on performing the verification. For example, the verification system may instruct a third party, associated with the account of the user, to activate the account of the user (e.g., for use on the third party's website).

By using techniques as described in connection with FIGS. 1A-1D, the user device conserves power, processing resources, memory overhead, and network overhead as compared with re-transmitting information associated with successful verification operations. Additionally, the verification system conserves power, processing resources, and memory overhead as compared with repeating all verification operations.

As indicated above, FIGS. 1A-1D are provided as an example. Other examples may differ from what is described with regard to FIGS. 1A-1D.

FIGS. 2A, 2B, 2C, and 2D are diagrams of example UIs 200, 210, 220, and 230, respectively, associated with verification outcomes for a user. As described in connection with FIGS. 1C-1D, a verification system may generate and transmit, and a client device may receive and show, one or more UIs as illustrated by example UIs 200, 210, 220, and 230. The verification system and the client device are described in more detail below in connection with FIGS. 4 and 5.

Figure 2A:
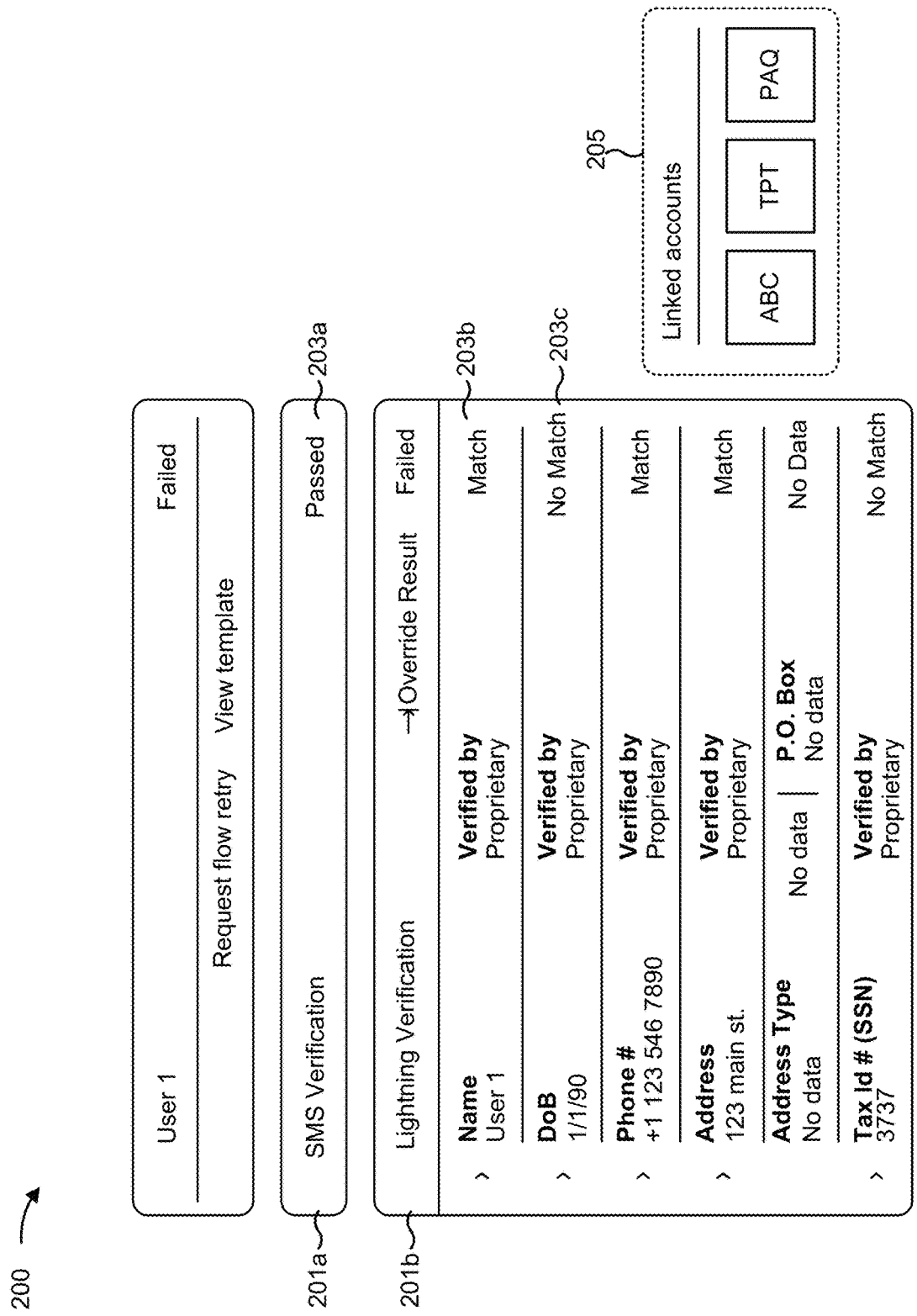
Figure 2B:
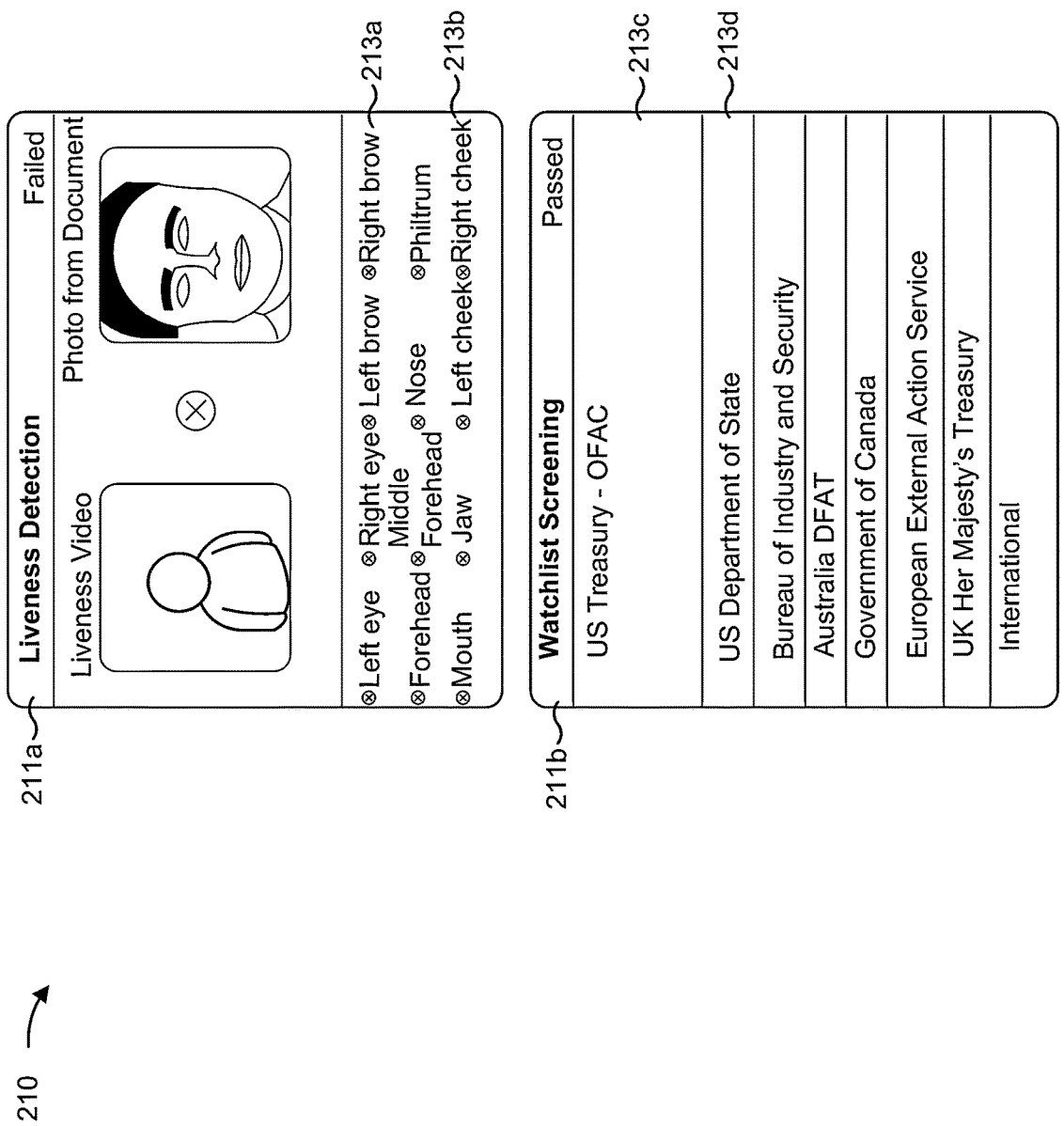

As shown in FIG. 2A, the example UI 200 may include one or more visual boxes associated with outcomes from corresponding verification operations for the user. For example, visual box 201a is associated with a verification operation for a mobile phone number of the user, and visual box 201b is associated with a text-based verification operation for the user. Similarly, in the example UI 210 of FIG. 2B, visual box 211a is associated with a verification operation for a document of the user, and visual box 211b is associated with a verification operation for the user against one or more screening lists. Accordingly, the example UI 210 may be combined with the example UI 200 (e.g., to be viewed by scrolling). The visual boxes 201a, 201b, 211a, and 211b may each be delineated by a border, as shown in FIGS. 2A and 2B. Alternatively, the visual boxes 201a, 201b, 211a, and 211b may each include a group of pixels logically distinct from a remaining portion of pixels in the example UIs 200 and 210.

Additionally, each visual box may include at least one indicator associated with at least one verification test included in the corresponding verification operation. For example, the visual box 201*a* includes at least indicator 203*a* associated with a passed outcome, and the visual box 201*b* includes at least indicator 203*b* associated with a passed outcome and indicator 203*c* associated with a failed outcome. Indicators 203*a*, 203*b*, and 203*c* are shown as text but may additionally or alternatively include other types of indicators. For example, as shown in FIG. 2B, the visual box 211*a* includes at least indicator 213*a* associated with a failed outcome and indicator 213*b* associated with a failed outcome, where the indicators 213*a* and 213*b* include visual representations (the circles with Xs therein). In another example, the visual box 211*b* includes at least indicator 213*c* and indicator 213*d*. In some implementations, the indicators 213*c* and 213*d* may use colors of associated text to indicate outcomes.

In some implementations, the verification system may further determine that the user is associated with one or more accounts with external service providers (e.g., using an email address and/or a phone number provided by the user). Accordingly, the example UI 200 may include one or more visual indicators of the one or more accounts (e.g., as shown in area 205 of FIG. 2A).

As shown in FIG. 2C, interacting with an indicator in the example UI 200 may prompt generation of the example UI 220 including a plurality of additional indicators associated with outcomes of the at least one verification test from a plurality of data sources. For example, the indicator 203*b* included in the visual box 201*b* may be associated with additional indicators 221*a*, 221*b*, 221*c*, and 221*d* indicating a passed outcome from corresponding data sources. Although shown as visual representations, the additional indicators 221*a*, 221*b*, 221*c*, and 221*d* may additionally or alternatively include text and/or use colors of associated text to indicate outcomes. Although the plurality of data sources include credit sources, government sources, commercial sources, and consumer sources in the example UI 220, other examples may include additional data sources and/or different data sources.

In some implementations, the verification system may further determine that a device identifier or an IP address associated with the user is associated with one or more additional verification attempts for a same client. Accordingly, the verification system may generate an indication of the one or more additional verification attempts. For example, the verification system may generate a visual representation of the quantity of additional verification attempts. Additionally, in some implementations, the verification system may receive an interaction with the indication of the one or more additional verification attempts and therefore generate an overlay window including details associated with the one or more additional verification attempts. The overlay window may include the example UI 230 as shown in FIG. 2D.

Additionally, or alternatively, the verification system may further determine that a device identifier or an IP address associated with the user is associated with one or more additional verification attempts across a plurality of clients. Accordingly, the verification system may generate an indication of the one or more additional verification attempts. For example, the verification system may generate a visual representation of the quantity of additional verification attempts. The verification system may withhold details associated with the one or more additional verification attempts because they are associated with clients other than only the client using the client device to access the example UI 200.

As indicated above, FIGS. 2A-2D are provided as examples. Other examples may differ from what is described with regard to FIGS. 2A-2D.

Figure 3B:
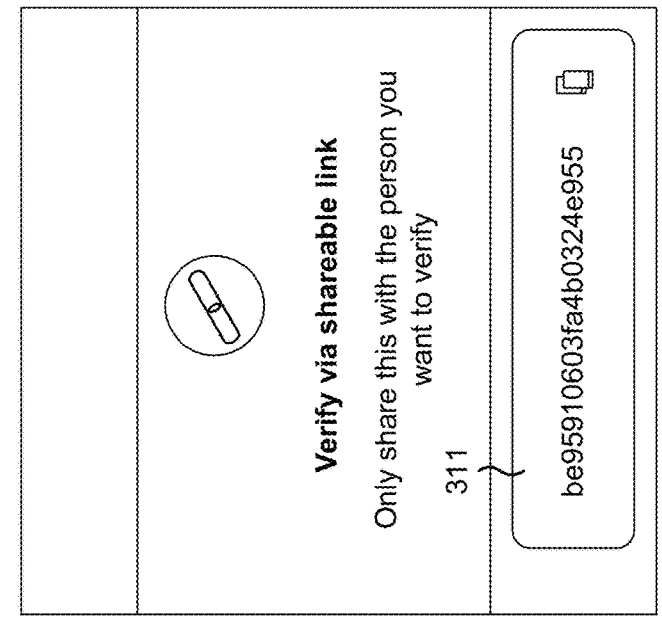

FIGS. 3A and 3B are diagrams of example UIs 300 and 310, respectively, associated with repeating verification procedures for a user. As described in connection with FIGS. 1C-1D, a verification system may generate and transmit, and a client device may receive and show, one or more UIs as illustrated by example UIs 300 and/or 310. The verification system and the client device are described in more detail below in connection with FIGS. 4 and 5.

As shown in FIG. 3A, the example UI 300 may include a set of radio buttons 301 (or another type of input element) to allow selection of how to repeat verification for the user. For example, the set of radio buttons 301 may allow selection of a full repeat, a repeat of verification operations associated with failure, or a repeat of selected verification operations. Additionally, the example UI 300 may include a button 303 (or another type of input element) associated with triggering the repeat verification (e.g., via a new URL, as described in connection with FIG. 3B, and/or via a modification to an existing URL, as described in connection with FIG. 1C).

As shown in FIG. 3B, the example UI 310 may include a text box 311 (or another type of output element) including the new URL for the repeat verification (e.g., based on a selection using the set of radio buttons 301). Accordingly, the new URL may be copied (e.g., to a clipboard) from the text box 311 and pasted (e.g., into a chat message, a text message, an email message, and/or another type of communication message to the user).

As indicated above, FIGS. 3A-3B are provided as examples. Other examples may differ from what is described with regard to FIGS. 3A-3B.

Figure 4:
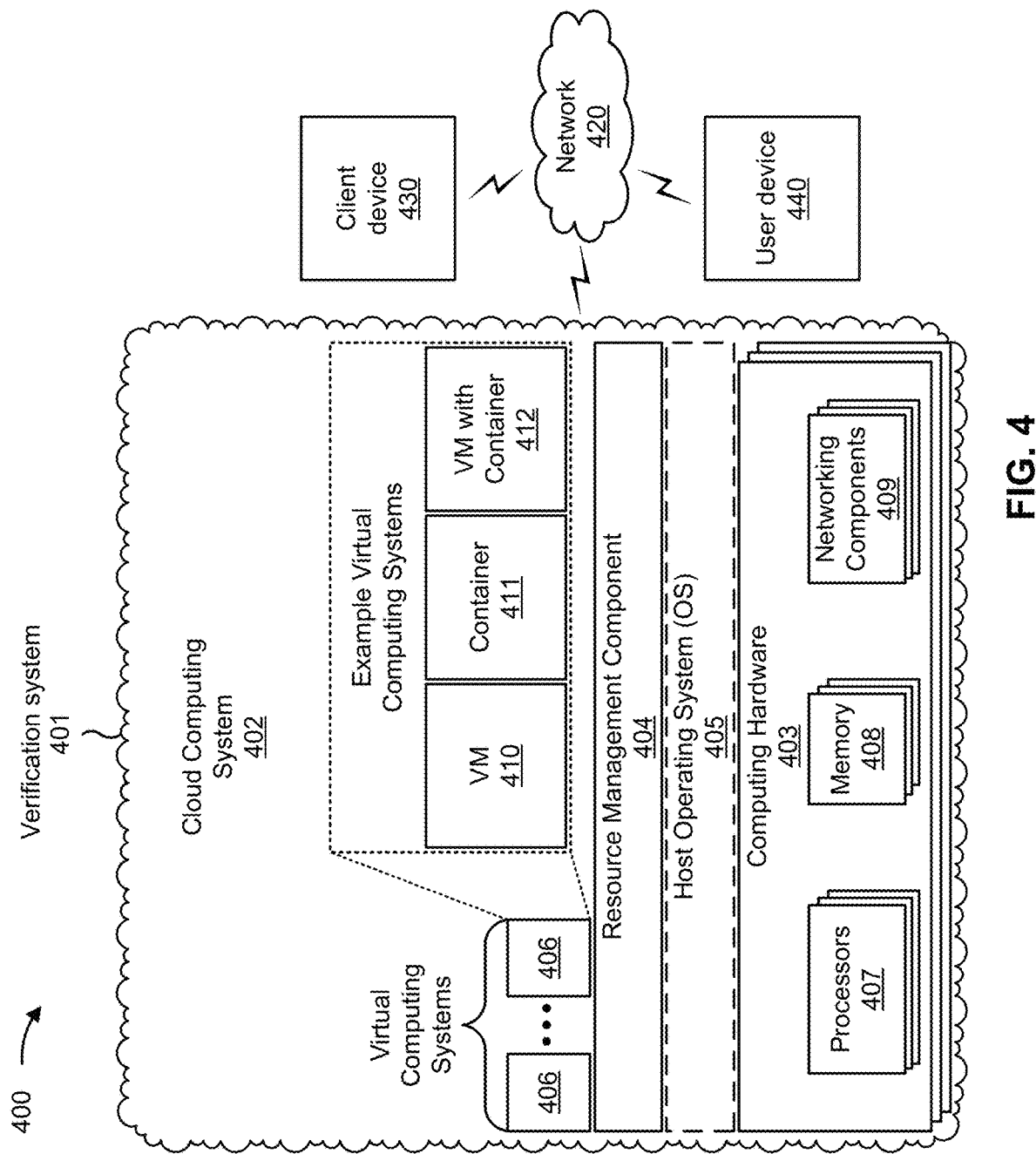
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a verification system 401, which may include one or more elements of and/or may execute within a cloud computing system 402. The cloud computing system 402 may include one or more elements 403-412, as described in more detail below. As further shown in FIG. 4, environment 400 may include a network 420, a client device 430, and/or a user device 440. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the verification system 401 may include one or more elements 403-412 of the cloud computing system 402, may execute within the cloud computing system 402, and/or may be hosted within the cloud computing system 402, in some implementations, the verification system 401 may not be cloud-based (e.g., may be implemented outside of a cloud computing system) or may be partially cloud-based. For example, the verification system 401 may include one or more devices that are not part of the cloud computing system 402, such as device 500 of FIG. 5, which may include a standalone server or another type of computing device. The verification system 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The client device 430 may include one or more devices capable of receiving, generating, storing, processing, providing, and/or routing information associated with verification operations, as described elsewhere herein. The client device 430 may include a communication device and/or a computing device. For example, the client device 430 may include a server, such as an application server, a client server, a web server, a database server, a host server, a proxy server, a virtual server (e.g., executing on computing hardware), or a server in a cloud computing system. In some implementations, the client device 430 may include computing hardware used in a cloud computing environment.

The user device 440 may include one or more devices capable of receiving, generating, storing, processing, and/or providing information associated with verification operations, as described elsewhere herein. The first user device 440 may include a communication device and/or a computing device. For example, the first user device 440 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
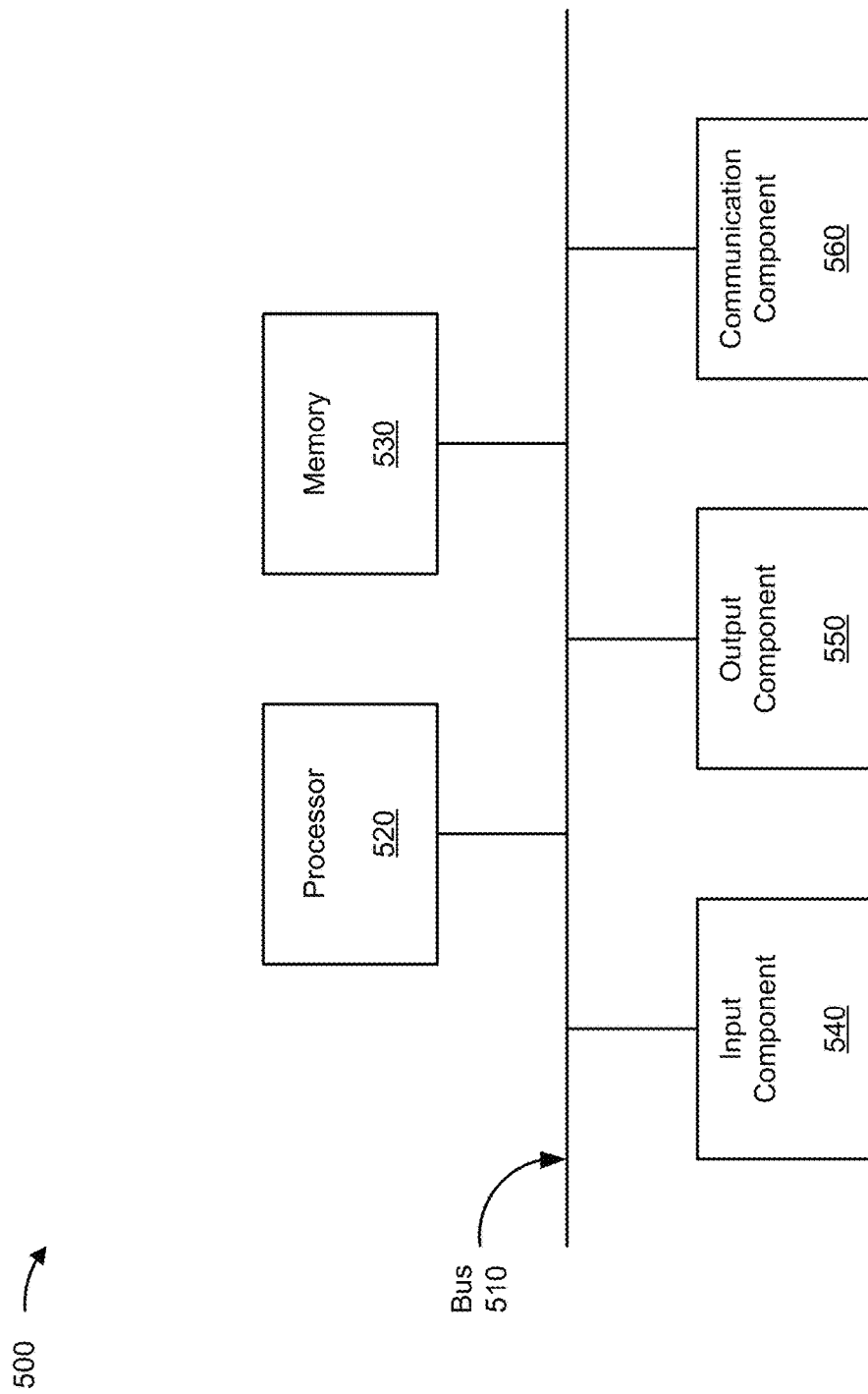
FIG. 5 is a diagram of example components of one or more devices of FIG. 4.

FIG. 5 is a diagram of example components of a device 500 associated with user verification with state machines. The device 500 may correspond to a client device 430 and/or a user device 440. In some implementations, the client device 430 and/or the user device 440 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
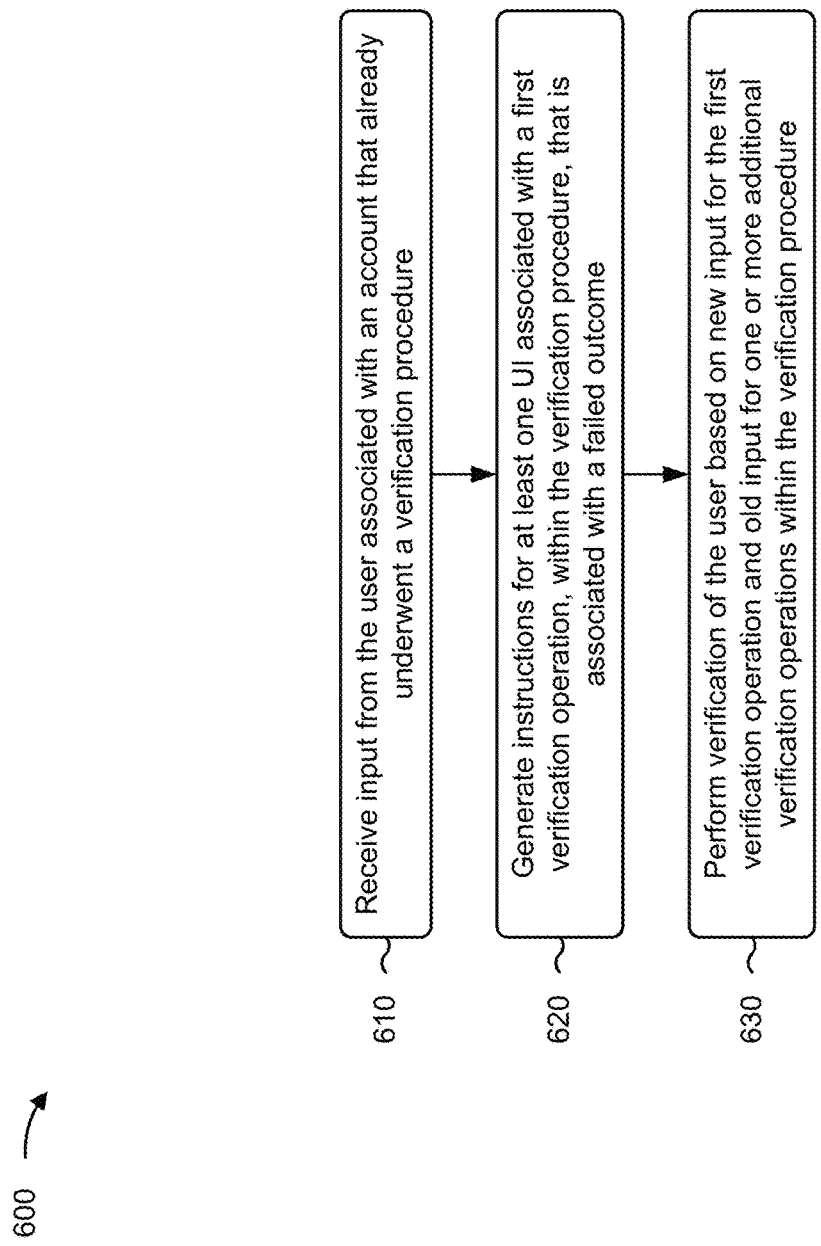

FIG. 6 is a flowchart of an example process 600 associated with repeating verification of a user. In some implementations, one or more process blocks of FIG. 6 may be performed by the verification system 401. In some implementations, one or more process blocks of FIG. 6 may be performed by another device or a group of devices separate from or including the verification system 401, such as the client device 430 and/or the user device 440 Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving input from a user associated with an account that already underwent a verification procedure (block 610). For example, the verification system 401 (e.g., using processor 520, memory 530, input component 540, and/or communication component 560) may receive input from a user associated with an account that already underwent a verification procedure, as described above in connection with reference number 140 of FIG. 1C.

As further shown in FIG. 6, process 600 may include generating instructions for at least one UI associated with a first verification operation, within the verification procedure, that is associated with a failed outcome (block 620). For example, the verification system 401 (e.g., using processor 520, memory 530, output component 550, and/or communication component 560) may generate instructions for at least one UI associated with a first verification operation, within the verification procedure, that is associated with a failed outcome, as described above in connection with reference number 140 of FIG. 1C.

As further shown in FIG. 6, process 600 may include performing verification of the user based on new input for the first verification operation and old input for one or more additional verification operations within the verification procedure (block 630). For example, the verification system 401 (e.g., using processor 520 and/or memory 530) may perform verification of the user based on new input for the first verification operation and old input for one or more additional verification operations within the verification procedure, as described above in connection with reference number 150 of FIG. 1D.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1D, 2A-2D, and/or 3A-3B.

FIG. 7 is a flowchart of an example process 700 associated with repeating verification of a user. In some implementations, one or more process blocks of FIG. 7 may be performed by the client device 430. In some implementations, one or more process blocks of FIG. 7 may be performed by another device or a group of devices separate from or including the client device 430, such as the verification system 401 and/or the user device 440. Additionally, or alternatively, one or more process blocks of FIG. 7 may be performed by one or more components of the device 500, such as processor 520, memory 530, input component 540, output component 550, and/or communication component 560.

As shown in FIG. 7, process 700 may include generating one or more visual boxes, each visual box being associated with an outcome from a corresponding verification operation for a user and including at least one indicator associated with at least one verification test included in the corresponding verification operation (block 710). For example, the client device 430 (e.g., using processor 520, memory 530, and/or output component 550) may generate one or more visual boxes, each visual box being associated with an outcome from a corresponding verification operation for a user and including at least one indicator associated with at least one verification test included in the corresponding verification operation, as described above in connection with reference number 130 of FIG. 1C.

As further shown in FIG. 7, process 700 may include generating a visual selector for restarting all corresponding verification operations or restarting only the corresponding verification operation associated with failure as a corresponding outcome (block 720). For example, the client device 430 (e.g., using processor 520, memory 530, and/or output component 550) may generate a visual selector for restarting all corresponding verification operations or restarting only the corresponding verification operation associated with failure as a corresponding outcome, as described above in connection with reference number 130 of FIG. 1C.

As further shown in FIG. 7, process 700 may include transmitting a modification associated with a link based on interaction with the visual selector (block 730). For example, the client device 430 (e.g., using processor 520, memory 530, and/or communication component 560) may transmit a modification associated with a link based on interaction with the visual selector, as described above in connection with reference number 135 of FIG. 1C.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1D, 2A-2D, and/or 3A-3B.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for verifying a user, the system comprising:
one or more memories; and
one or more processors, communicatively coupled to the one or more memories, configured to:
receive a request to verify the user;
generate instructions for a plurality of first user interfaces (UIs) associated with an initial verification procedure for the user that includes a plurality of verification operations;
receive a plurality of initial inputs each corresponding to one of the plurality of verification operations, wherein the plurality of initial inputs include a first input associated with the user;
determine that the initial verification procedure based on the first input is associated with a failed outcome;
generate instructions for at least one second UI associated with a repeat verification procedure for the user, wherein the repeat verification procedure is associated with at least a subset of the plurality of verification operations;
receive a second input associated with the user;
refrain from repeating a verification operation of the plurality of verification operations corresponding to the first input;
determine an outcome of a verification operation of the plurality of verification operations based on the second input and at least some of the plurality of initial inputs excluding the first input; and
verify the user based at least in part on the outcome of the verification operation.

2. The system of claim 1, wherein the one or more processors are further configured to:
receive a request for the repeat verification procedure, wherein the request comprises a request associated with a uniform resource locator (URL).

3. The system of claim 1, wherein the second input comprises at least one image of the user or at least one image of a document associated with the user.

4. The system of claim 1, wherein the first input comprises text associated with, and entered by, the user.

5. The system of claim 1, wherein the one or more processors are further configured to:
refrain from generating instructions for one or more additional UIs associated with the remaining verification operations.

6. The system of claim 1, wherein the one or more processors, to generate the plurality of first UIs, are configured to:
transmit, to a first user device associated with the user, a portion of the plurality of first UIs; and transmit, to a second user device associated with the user, a remaining portion of the plurality of first UIs.

7. The system of claim 1, wherein a subset of verification operations is determined based on the failed outcome, and the subset of verification operations comprises the verification operation and one or more of the remaining verification operations, and
wherein the repeat verification procedure includes the subset of verification operations.

8. The system of claim 1, wherein refraining from repeating the remaining verification operations is associated with one or more verification operations related to a successful outcome based on the first input.

9. A method of providing visual interfaces for verification outcomes, comprising:
generating a plurality of visual boxes, wherein each visual box is associated with an outcome from a corresponding verification operation for a user and includes at least one indicator associated with at least one verification test included in the corresponding verification operation,
wherein the user is verified based on a combination of the outcome from each corresponding verification operation;
generating a visual selector that shows a first option for restarting all corresponding verification operations and a second option for restarting only the corresponding verification operation associated with failure as a corresponding outcome; and
transmitting a modification associated with a link based on interaction with the visual selector,
wherein if the interaction with the visual selector is the first option, verify the user by restarting all corresponding verification operations, and
wherein if the interaction with the visual selector is the second option, verify the user by restarting only the corresponding verification operation associated with failure as a corresponding outcome.

10. The method of claim 9, further comprising:
receiving an interaction with the at least one indicator; and
generating a plurality of additional indicators associated with the at least one verification test included in the corresponding verification operation and associated with outcomes of the at least one verification test from a plurality of data sources.

11. The method of claim 9, further comprising:
determining that the user is associated with one or more accounts with external service providers; and
generating one or more visual indicators of the one or more accounts.

12. The method of claim 9, further comprising:
determining that a device identifier or an Internet protocol (IP) address associated with the user is associated with one or more additional verification attempts for a same client; and
generating an indication of the one or more additional verification attempts.

13. The method of claim 12, further comprising:
receiving an interaction with the indication of the one or more additional verification attempts; and
generating an overlay window including details associated with the one or more additional verification attempts.

14. The method of claim 9, further comprising:
determining that a device identifier or an Internet protocol (IP) address associated with the user is associated with one or more additional verification attempts across a plurality of clients; and
generating an indication of the one or more additional verification attempts.

15. The method of claim 9, wherein transmitting the modification associated with the link comprises:
transmitting an updated uniform resource locator (URL) to a user device.

16. The method of claim 9, wherein transmitting the modification associated with the link comprises:
transmitting a command to modify a hypertext transfer protocol (HTTP) response.

17. A non-transitory computer-readable medium storing a set of instructions for verifying a user, the set of instructions comprising:
one or more instructions that, when executed by one or more processors of a device, cause the device to:
receive a plurality of initial inputs each corresponding to one of a plurality of verification operations of a verification procedure, wherein the plurality of initial inputs include a first input associated with the user;
generate instructions for at least one user interface (UI) associated with a repeat verification procedure for the user, wherein the repeat verification procedure is associated with at least a subset of the plurality of verification operations; and
receive a second input associated with the user;
refrain from repeating a verification operation of the plurality of verification operations corresponding to the first input;
determine an outcome of a verification operation of the plurality of verification operations based on the second input and at least some of the plurality of initial inputs excluding the first input; and
verify the user based at least in part on the outcome of the verification operation.

18. The non-transitory computer-readable medium of claim 17, wherein the one or more instructions, when executed by the one or more processors, further cause the device to:
activate an account associated with the user based on the outcome of the verification operation.

19. The non-transitory computer-readable medium of claim 17, wherein the plurality of initial inputs comprises a hypertext transfer protocol (HTTP) call.

20. The non-transitory computer-readable medium of claim 17, wherein the one or more instructions, when executed by the one or more processors, further cause the device to:
refrain from generating instructions for at least one second UI associated with a second verification operation, within the verification procedure, that is associated with a successful outcome.

* * * * *